United States Patent
Shelby, III

(10) Patent No.: US 8,117,240 B1
(45) Date of Patent: Feb. 14, 2012

(54) REMOTE APPLICATION LINKING INFRASTRUCTURE

(75) Inventor: David C. Shelby, III, Kennesaw, GA (US)

(73) Assignee: Southern Company Services, Inc., Atlanta, GA (US)

( * ) Notice: Subject to any disclaimer, the term of this patent is extended or adjusted under 35 U.S.C. 154(b) by 874 days.

(21) Appl. No.: 12/178,305

(22) Filed: Jul. 23, 2008

(51) Int. Cl.
*G06F 17/30* (2006.01)

(52) U.S. Cl. ......... 707/803; 707/705; 707/770; 707/797

(58) Field of Classification Search ............... 707/705, 707/770, 797, 803; 709/217; 717/122; 705/51; 715/835
See application file for complete search history.

(56) References Cited

U.S. PATENT DOCUMENTS

| | | | |
|---|---|---|---|
| 6,357,038 B1 * | 3/2002 | Scouten | 717/122 |
| 6,463,459 B1 | 10/2002 | Orr et al. | |
| 6,785,726 B1 | 8/2004 | Freeman et al. | |
| 6,918,113 B2 | 7/2005 | Patel et al. | |
| 6,959,288 B1 * | 10/2005 | Medina et al. | 705/51 |
| 6,999,945 B1 | 2/2006 | Freeny, Jr. | |
| 7,111,060 B2 | 9/2006 | Araujo et al. | |
| 7,117,243 B2 | 10/2006 | Peart | |
| 7,254,786 B2 * | 8/2007 | Henriquez | 715/835 |
| 7,617,178 B2 * | 11/2009 | Chavez et al. | 707/705 |
| 2002/0010754 A1 | 1/2002 | Brown | |
| 2004/0054717 A1 | 3/2004 | Aubry et al. | |
| 2004/0255289 A1 | 12/2004 | Alex George et al. | |
| 2005/0198612 A1 | 9/2005 | Gonzalez | |
| 2006/0085381 A1 | 4/2006 | Fugate et al. | |
| 2006/0230105 A1 | 10/2006 | Shappir et al. | |
| 2007/0088797 A1 | 4/2007 | Boone et al. | |
| 2008/0034071 A1 | 2/2008 | Wilkinson et al. | |

OTHER PUBLICATIONS

Scott Sanbauer, "Access Your Files and Apps from Anywhere for Free"; Source: PC World, v 23, n 7, Jul. 2005, p. 170.
T. Richardson, et al., "Virtual Network Computing", Source: IEEE Internet Computing, v 2, n 1, Jan.-Feb. 1998, p. 33-38.

\* cited by examiner

*Primary Examiner* — Shahid Alam
(74) *Attorney, Agent, or Firm* — Womble Carlyle Sandridge & Rice, LLP

(57) ABSTRACT

A method, system, and computer readable medium for controlling user access from a segmented network to shared remote applications stored on a remote server. The method begins by generating a folder/file structure for a remote application that is to be shared on the segmented network. A file server drive mapping to a linking infrastructure data is generated for the remote application and an icon associated with the remote application is retrieved. An application launcher file is generated for the remote application. Then, an application linker file associated with the application launcher file for the remote application is generated. A command file is generated for copying the application linker file to a user's desktop. The linker file is updated to point to the file server drive. A folder for user access to the remote application is then deployed that includes the remote application icon, the application linker file, the application launcher file, and the command file.

14 Claims, 3 Drawing Sheets

REMOTE APPLICATION LINKING INFRASTRUCTURE

BACKGROUND OF THE INVENTION

Embodiments of the invention relate generally to providing controlled access to software applications and, more particularly, to providing controlled access to software applications resident on servers external to an enterprise network.

In a large enterprise, it often becomes necessary to segregate the application access rights of certain users in a domain from all other users in the domain. For example, in electric power companies, the Federal Energy Regulatory Commission has mandated that certain power company employees be segmented from the rest of the power company's data network to prevent those employees from gaining inside information about electricity generation and/or transmission. However, those same employees would still need to be able to access a number of different software applications to perform their day to day jobs. Since the firewall rules that would have to be put in place to allow these employees to access the software applications from their desktops would have been very broad, and there was no way for them to be fully segregated from the rest of the power company's computer data network, these applications are run from remote servers located outside the power company's primary and non-segregated network.

SUMMARY

Embodiments of the invention are directed to a remote application linking infrastructure for controlling access to Citrix Presentation Server-based Windows applications. Since there is no way for certain users to be fully segregated from the rest of the corporate data network, these Windows applications can be run from remote access servers, such as those offered by Citrix Systems. However, the embodiments described herein prevent employee users in a single domain from accessing Citrix-based applications that they are not permitted to run even though those Citrix-based applications are "published" or available to all users within that single domain.

In embodiments of the invention, a short cut or "linker" file is installed onto the end user's desktop that points out to the user's X drive for all of its configuration information. An "X" drive is just a generic drive letter assignment used as a convenient designation in the present application. This is a file server mapping that is created for all of the client PC's during the logon process. This mechanism, a file server drive mapping to the remote application linking infrastructure data, makes embodiments of the invention far simpler to implement, support, and scale up in an enterprise environment. The configuration information includes the icon that it uses so that the end user can readily identify the application linker file that is used to instantiate the remote Citrix application session.

In one embodiment of the invention, a method, system, and computer readable medium are provided for controlling user access from a segmented network to shared remote applications stored on a remote server. The method begins by generating a folder/file structure for a remote application that is to be shared on the segmented network. A file server drive mapping to the linking infrastructure data is generated for the remote application and an icon associated with the remote application is retrieved. An application launcher file is generated for the remote application. Then, an application linker file associated with the application launcher file for the remote application is generated. A command file is generated for copying the application linker file to a user's desktop. The linker file is updated to point to the file server drive. A folder for user access to the remote application is then deployed to the end user's local file server that includes the remote application icon, the application linker file, the application launcher file, and the command file.

The system includes a plurality of components that perform the steps of the method when operated on a computer system. The computer readable medium includes a plurality of computer instructions embedded therein, the computer readable medium implementing the method when operated on the computer system.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION

Figure 1:
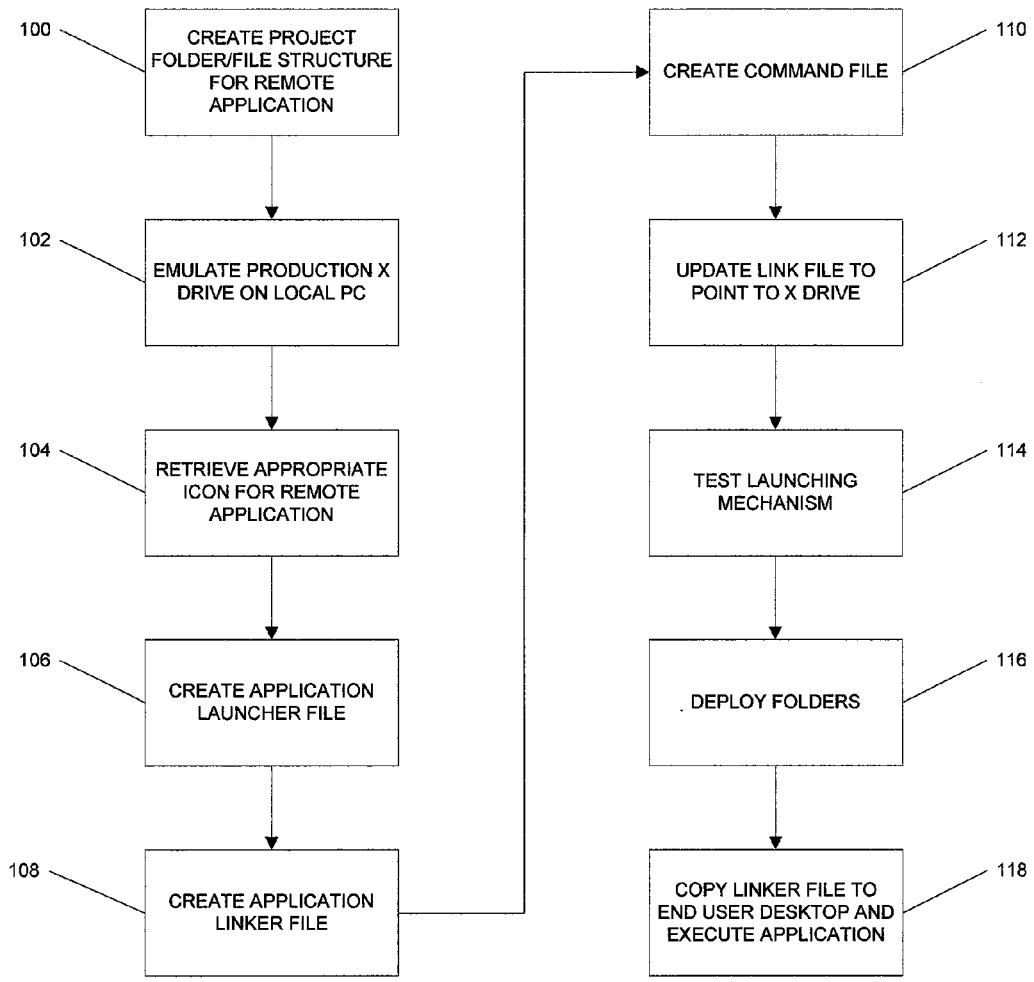
FIG. 1 illustrates high level processing logic for generating the remote application linking infrastructure in accordance with an exemplary embodiment of the invention.

The following description of the invention is provided as an enabling teaching of the invention and its best, currently known embodiments. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments of the invention and not in limitation thereof, since the scope of the invention is defined by the claims.

Briefly, in the embodiments of the invention described herein, the end user is provided a centrally controlled and administered set of application icons. Application icons are not dynamically provided via enumeration or any lookup mechanism, thereby increasing segregation and security. The application icons allow end user access only to specific servers via specific ports thereby maintaining stringent segregation and security standards. The application icons are seamlessly integrated into the end user's desktop. While the shortcuts or "linker" files are originally copied to the end user's desktop, these shortcut or "linker files" can be moved anywhere that the end user chooses to help the end user organize his PC as he sees fit thereby minimizing the perception of segregation. The shortcuts or linker files will, in turn, work or link regardless of where they are placed in the end user's local PC file system. The embodiments described permit the end user to connect to the remote server in a load-balanced fashion. While dynamic application enumeration/lookup is prevented as already mentioned, server resource availability look up is not prevented. The embodiments described allow administrators to update the properties of the application icons in a centralized location thus negating the need to update each remote/segregated PC.

Remote access/application publishing products (e.g., Citrix Presentation Server) allow users to connect to applications available from central servers. The advantage of publishing applications using these products is that it lets users connect to these applications remotely, using devices outside of their corporate networks. Users can log in to their corporate network remotely, view all of the applications they would be able to view in the office, including Outlook email and any internal applications, and access them remotely in a secure environment. The application would appear to the user, as if it was installed and running on his computer (i.e., seamless desktop integration), when the application is actually running on a Citrix server, usually hosted in the corporate environment.

The end user first accesses the internal web portal called "web icons" and his local credentials are passed to this web portal automatically. The web portal then allows the user to see only those icons that he is specifically allowed to see, and not icons that everyone is allowed to see, so that he can't "install" any applications that he should not be running on to his local PC. The reader should note that web icons is a non-public application that is primarily intended to deliver application installation packages to remote PC's. Commercial applications providing similar functionality are suitable for use instead of web icons.

Among the icons that the users can see are the RALI-based Citrix applications they are allowed to run centrally from Citrix servers on the enterprise network that they otherwise would not be allowed to access. When the user clicks one of these icons in the web icons portal, the icon points out to a batch file on his X drive (all part of RALI) that when executed, then copies the linker file to his desktop. This linker file's properties in turn point back out to the user's X drive location for all of its properties information which includes the icon information (i.e., .ico file) and the application launching information (i.e., .ica file) that are also all part of RALI. This is what allows the end user to move the shortcuts anywhere he wants and allows administrators to manipulate the X drive data on a central file server rather than on each workstation.

There are two important advantages to this design: (1) the end users do not have to go to the Citrix web portal to log in and enumerate all applications that are available for their use. This adds a layer of security and/or segmentation in the case of the power company users because they only "install" the applications to their desktops that they are allowed to see in web icons; (2) to make updates to the applications these employees are accessing, the system administrator updates the information on the file servers rather than access and update each client workstation. This allows the system administrator to make changes that the end user is not aware of and is not affected by the changes.

Embodiments of the invention also could be used to seamlessly integrate remote Citrix-based applications into a user's desktop. The shortcut or linker files copied to the end user's desktop can be copied by the end user to any location. For example, the end user can put the linker files in Start Menu>Programs so that the application could be launched by going to Start>Programs and clicking the application icon. The application would appear to be installed on the local PC but actually would be run remotely from a Citrix server. Centralized remote applications of this nature normally perform far better and are much easier to maintain than applications installed locally on each PC. In addition, an end user could move the linker files copied to his PC into the Startup folder with the application automatically launching upon login.

FIG. 1 illustrates high level processing logic for generating the remote application linking infrastructure in an exemplary embodiment of the invention. The remote application is installed and published from a shared Citrix environment. Although the invention is described in the context of deployment in a Citrix-based shared environment, any other shared environment having similar capabilities to Citrix servers and thin clients also would be suitable to deploy the invention.

The process starts, as indicated in logic block 100, with the Citrix administrator creating a project folder/file structure for the remote application to be shared by end users on the enterprise segmented network. The Citrix Administrator then emulates the production X drive environment on his local workstation or personal computer (PC) as indicated in logic block 102. This is a file server drive mapping to the remote application linking infrastructure data. The Citrix Administrator then retrieves an appropriate icon for the remote application as indicated in logic block 104. In the next three steps of the process, the Citrix Administrator creates: (1) an application launcher file (logic block 106), (2) an application linker file (logic block 108), and (3) a command file (logic block 110). In an exemplary embodiment, the application launcher file is created using the terminal server client on the Citrix Administrator's PC to log into a shared environment Citrix server and access the Citrix Presentation Server Console (PSC) as further described in an example below. The application linker file and command file are created directly on the user's PC.

Next, as indicated in logic block 112, the Citrix Administrator updates the link file in the links folder to point to the X drive. The user then can test the launching mechanism as indicated in logic block 114 by double-clicking and then running the corresponding command file. A shortcut is copied to the user's desktop which should instantiate the remote application. The Citrix Administrator also checks the properties of the desktop shortcut to ensure that the icon property points to the user's chosen icon. If the launch tests are successful, the icons, launch, link and command folders corresponding to the remote application can be deployed, as indicated in logic block 116. At this point, the end users can execute the command file via web icons thus copying the linker file to their desktops and executing the remote application hosted on a Citrix application server.

The following example further illustrates principles of embodiments of the invention. This example assumes that the application that is being made available for users on the enterprise segmented network is already installed to, and published from, the shared Citrix environment. In the example, an application called "CATS" will be configured for access from the enterprise segmented network to the shared Citrix environment.

Figure 2:
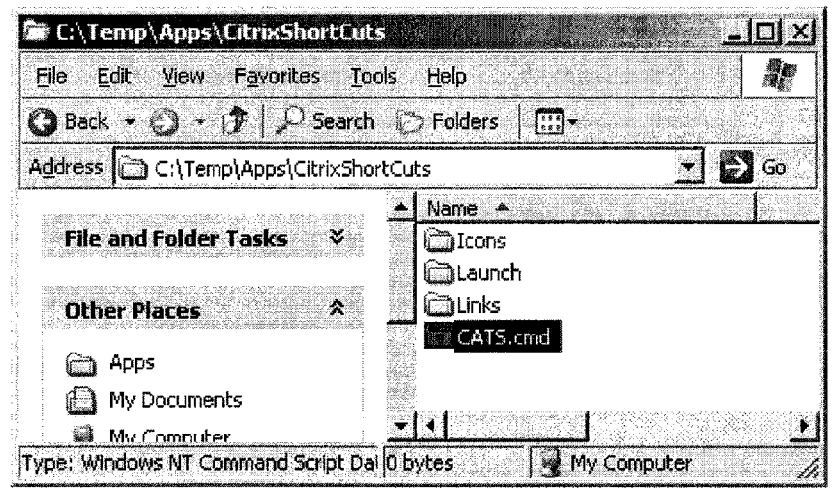
FIG. 2 illustrates an exemplary project folder/file structure that is created in accordance with an exemplary embodiment of the invention.

The process begins with the Citrix Administrator creating a project folder/file structure. On the local PC, the Citrix Administrator browses to C:\Temp. Within the C:\Temp directory, the Citrix Administrator creates a folder named "Apps." Within C:\Temp\Apps, the Citrix Administrator creates a folder named "CitrixShortCuts." Inside the CitrixShortCuts folder, the Citrix Administrator creates the following three folders: (1) a folder named "Icons," (2) a folder named "Launch," and (3) a folder named "Links." Next, inside the CitrixShortCuts folder, the Citrix Administrator creates an empty command file (.CMD extension) that is named after the application to which the end user will connect. For this example, the command file will be called "CATS.cmd." The Citrix Administrator creates the empty command file using Notepad to create a text file having the application's name. The Citrix Administrator then renames the file with the .CMD extension. FIG. 2 illustrates an exemplary folder/file structure that results after the preceding steps are performed.

The process continues with the Citrix Administrator emulating the production X drive environment on his local PC. The X drive represents a generic drive letter mapping to the end user's local file server. On the local PC, the Citrix Administrator browses to C:\Temp. Then, the Citrix Administrator shares out the Apps folder on his local PC to provide full control for everyone at the share level. The Citrix Administrator opens a command prompt on his local PC, and deletes his X drive mapping by issuing the following command:
   net use x:/delete
The Citrix Administrator maps his X drive to the shared Apps folder on his local PC by issuing the following command:
   net use x: \\MyPCName\Apps
In the preceding command, "MyPCName" is the hostname of his PC. The user can type "Hostname" and press enter in the above command prompt to retrieve the hostname of his PC if he does not know it.

The next step in the process is retrieval of the appropriate icon for the application on which the Citrix Administrator is working. The Citrix Administrator finds the icon that this application is using. The Citrix Administrator retrieves a copy of the proper icon from the icon server and places it in the icons folder on his local PC at C:\Temp\Apps\CitrixShortCuts\Icons.

After retrieving the appropriate icon, the Citrix Administrator creates the application launcher file. The Citrix Administrator uses the terminal server client on his local PC to log into one of the production shared environment Citrix servers. To do so, the Citrix Administrator goes to Start>All Programs>Citrix>Management Consoles>Presentation Server Console (PSC) and launches the Citrix Presentation Server Console. If necessary, the Citrix Administrator enables Pass Through authentication if prompted. Next, the Citrix Administrator opens the Applications folder in the upper left hand corner of the PSC display and browses through the folder structure until he locates the published application that he is trying to provide to the users on the segmented network.

Once the Citrix Administrator locates the target application, the Citrix Administrator clicks to highlight the target application, right clicks on it, and chooses "Create ICA File." At the "Welcome to the ICA File Wizard" screen, the Citrix Administrator clicks "Next" to accept the default. The Citrix Administrator also clicks "Next" at the "Specify Session Settings" screen, the "Encryption" screen, the "Specify ICA Compression" screen, and the "Select Audio Setting" screen to accept the defaults.

When the Citrix Administrator arrives at the "TCP/IP+HTTP Server" screen, he clicks to check the "Use TCP/IP+HTTP" browsing option. Then, in the TCP/IP+HTTP Server box, the Citrix Administrator types in Citrix-XML.enterprise.com. It should be noted that Citrix-XML.enterprise.com is a generic DNS alias, also called a CNAME record, that aliases multiple Citrix servers. The point of this alias to allow access to the XML service on multiple Citrix servers for load balancing and redundancy purposes. The Citrix Administrator leaves the port setting at the well-known default HTTP web server port 80 and clicks "Next" to reach the "Specify ICA File Name" screen. At the "Specify ICA File Name" screen, the Citrix Administrator again clicks "Next." At the "Create HTML File" screen, the Citrix Administrator clicks "Next" to accept the default of "No." At the "ICA File Summary" screen, the Citrix Administrator clicks "Finish." Once the Citrix Administrator is on the Citrix server, the Citrix Administrator browses to E:\SrvApps\Citrix\Administration where he will find the newly created ICA file in this location. The Citrix Administrator copies and pastes this new ICA file to his local PC. Next, the Citrix Administrator copies and pastes this new ICA file into the C:\Temp\Apps\CitrixShortCuts\Launch folder.

Figure 3:
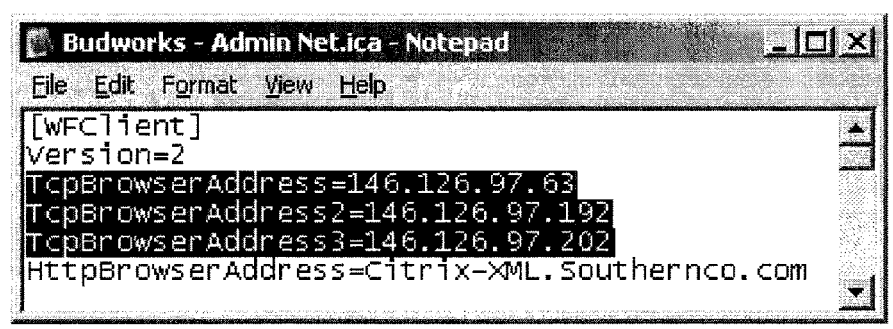
FIG. 3 illustrates a WinFrame (WF) Client section of an application launcher file including TCP and HTTP browser addresses.
Figure 4:
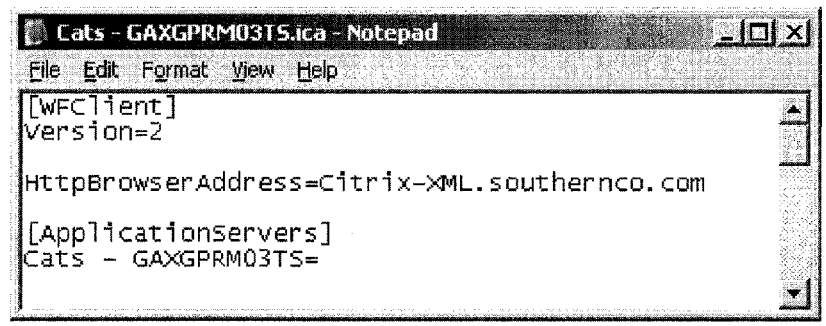
FIG. 4 illustrates a WinFrame (WF) Client section of the application launcher file after deleting the TCP browser addresses.

The Citrix Administrator right clicks on the new ICA file in the above folder and sends it to NotePad. As illustrated in FIG. 3, under the [WFClient] section of the ICA file, the Citrix Administrator removes all TCPBrowserAddress entries leaving only the HTTPBrowserAddress entry. This results in the [WFClient] section of the ICA file resembling that illustrated in FIG. 4. The Citrix Administrator then clicks File>Save and File>Exit. The [WFClient] section describes the WinFrame client.

At this point in the overall process, the Citrix Administrator can create the application linker file. To do so, the Citrix Administrator browses to the Links folder at C:\Temp\Apps\CitrixShortCuts\Links. The Citrix Administrator then right clicks within the folder and selects New>Shortcut. The Citrix Administrator clicks the "Browse" button and browses to the launcher file that he created previously and that is located in C:\Temp\Apps\CitrixShortCuts\Launch. The Citrix Administrator clicks "Next," accepts the default name for the short cut, and clicks "Finish."

Figure 5:
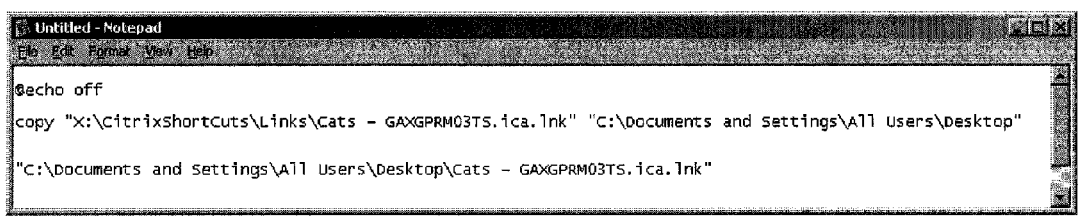
FIG. 5 illustrates a portion of an edited command file in accordance with an exemplary embodiment of the invention.

After the application linker file is created, the Citrix Administrator creates the command file. The Citrix Administrator browses to the empty command file on his local PC located in C:\Temp\Apps\CitrixShortCuts, right clicks on the command file, and sends the command file to Notepad for editing. The Citrix Administrator than copies and pastes the following text into the command file:
   @echo off
   copy  "X:\CitrixShortCuts\Links\NAME_OF_YOUR_LAUNCH_FILE.lnk"
   "C:\Documents and Settings\All Users\Desktop"
   "C:\Documents and Settings\All Users\Desktop\NAME_OF_YOUR_LAUNCH_FILE.lnk"
The Citrix Administrator updates the NAME_OF_YOUR_LAUNCH_FILE section of the command file with the name of the launch file including the .ICA extension. As described above, the launch file is located in C:\Temp\Apps\CitrixShortCuts\Launch. It should be noted that in the above paths, the NAME_OF_YOUR_LAUNCH_FILE entry can be copied from the properties of the launch file. The Citrix Administrator needs to ensure that he keeps the ink file extension at the end of the launch name. As illustrated in FIG. 5, the application launch file is named Cats—GAXGPRM03TS.ica and is given the .lnk extension. The Citrix Administrator clicks File>Save and File>Exit to save the changes to the command file.

Following creation of the command file, the Citrix Administrator updates the link file to point to the X Drive. The Citrix Administrator browses to the new X drive where he should see the CitrixShortsCuts folder just as it will appear in production. The Citrix Administrator double clicks on the CitrixShortCuts folder, double clicks the Links folder, right clicks the shortcut in the Links folder, and chooses Properties. In the Target box, the Citrix Administrator changes the path to the following path name: "X:\CitrixShortCuts\ Launch\ Name_Of_Your_ICA_File.ica." The path includes the quotes at each end of the path name. In the Start In box, the Citrix Administrator changes the path to X:\CitrixShortCuts\Launch. Next, the Citrix Administrator clicks the Change Icon button, then clicks "Browse" and navigates to the following: X:\CitrixShortCuts\Icons\Your_Icon.ICO. The Citrix Administrator then clicks "Open" and "OK" to finish this step of the process.

After the Citrix Administrator updates the link file to point to the X Drive, the launching mechanism is tested. The Citrix Administrator begins by browsing to X:\CitrixShortCuts. The Citrix Administrator then double clicks the command file in this directory for the application with which he is working. At this point, a command window should open briefly, and a shortcut will be copied to the Citrix Administrator's desktop. The application that the Citrix Administrator is trying to launch should instantiate. If the Citrix Administrator gets any failure indication, he should retrace his work. If the application does launch, the Citrix Administrator should right click the shortcut that appears on the Citrix Administrator's desktop and check the Properties. The Citrix Administrator should find that the shortcut points to the ICA file in the Launch folder under X:\CitrixShortCuts\Launch and also should find that the icon property points to the chosen icon under X:\CitrixShortCuts\Icons. If both of the above paths are correct, the Citrix Administrator is done with the configuration of the launching mechanism. If either path is incorrect, the Citrix Administrator should retrace his work.

Following successful testing of the launch mechanism, the Citrix Administrator deploys the application for access by enterprise users. The Citrix Administrator copies the Icons, Launch and Links folders, and the command file from X:\CitrixShortCuts on his PC and places these folders into a folder named after the application that the Citrix Administrator is providing for access by enterprise users.

After the deployment of the aforementioned folders to X:\CitrixShortCuts on the production file server for the segmented users, when an end user clicks the corresponding Web Icon, the command file on X:\CitrixShortCuts will be called which will, in turn, copy the linker file to the end user's desktop and then execute the application. The linker file will retrieve all of the properties, target and icon from corresponding folders in the X:\CitrixShortCuts folders.

The system and method of the embodiments of the invention have been described as computer-implemented processes. It is important to note, however, that those skilled in the art will appreciate that the mechanisms of the embodiments described are capable of being distributed as a program product in a variety of forms, regardless of the particular type of physical signal bearing media utilized to carry out the distribution. Examples of signal bearing media include, without limitation, recordable-type media such as diskettes or CD ROMs.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments described without the corresponding use of other features. Accordingly, the foregoing description of the exemplary embodiments is provided for the purpose of illustrating the principles of the invention, and not in limitation thereof, since the scope of the invention is defined solely by the appended claims.

What is claimed:

1. A method for controlling user access from a segmented network to shared remote applications stored on a remote server, comprising the steps of:
   generating a folder/file structure for a remote application that is to be shared on the segmented network including an icon folder, a launch folder, a linker folder, and an empty command file;
   generating a file server drive mapping to a linking infrastructure data for the remote application;
   retrieving an icon associated with the remote application;
   generating an application launcher file for the remote application;
   generating an application linker file associated with the application launcher file for the remote application;
   generating a command file for copying the application linker file to a user's desktop;
   copying the retrieved icon, the application launch file, the application linker file, and the command file to the folder/file structure for the remote application;
   updating the linker file to point to the file server drive;
   deploying a folder for user access to the remote application, the folder including the remote application icon, the application linker file, the application launcher file, and the command file; and
   copying the application linker file to the user's desktop to enable execution of the remote application.

2. The method for controlling user access from a segmented network to shared remote applications of claim 1 further comprising testing a mechanism for instantiating the remote application on a user's desktop.

3. The method for controlling user access from a segmented network to shared remote applications of claim 2 wherein testing a mechanism for instantiating the remote application comprises opening a corresponding command file and copying the application linker file to the user's desktop to launch the remote application.

4. The method for controlling user access from a segmented network to shared remote applications of claim 1 wherein the application launcher file is generated using a terminal server client on a user's workstation.

5. The method for controlling user access from a segmented network to shared remote applications of claim 1 wherein the remote application is accessed from a Citrix server.

6. A system for controlling user access from a segmented network to shared remote applications stored on a remote server, comprising:
   a processor for executing a plurality of components, including:
      a component that generates a folder/file structure for a remote application that is to be shared on the segmented network including an icon folder, a launch folder, a linker folder, and an empty command file;
      a component that generates a file server drive mapping to a linking infrastructure data for the remote application;
      a component that retrieves an icon associated with the remote application;
      a component that generates an application launcher file for the remote application;
      a component that generates an application linker file associated with the application launcher file for the remote application;
      a component that generates a command file for copying the application linker file to a user's desktop;

a component that copies the retrieved icon, the application launch file, the application linker file, and the command file to the folder/file structure for the remote application;

a component that updates the linker file to point to the file server drive;

a component that deploys a folder for user access to the remote application, the folder including the remote application icon, the application linker file, the application launcher file, and the command file; and a component that copies the application linker file to the user's desktop to enable execution of the remote application.

7. The system for controlling user access from a segmented network to shared remote applications of claim 6 further comprising a component that tests a mechanism for instantiating the remote application on a user's desktop.

8. The system for controlling user access from a segmented network to shared remote applications of claim 7 wherein the component that tests a mechanism for instantiating the remote application comprises a component that opens a corresponding command file and a component that copies the application linker file to the user's desktop to launch the remote application.

9. The system for controlling user access from a segmented network to shared remote applications of claim 6 wherein the component that generates the application launcher file uses a terminal server client on a user's workstation.

10. The system for controlling user access from a segmented network to shared remote applications of claim 6 wherein the remote server comprises a Citrix server.

11. A non-transitory computer readable medium for controlling user access from a segmented network to shared remote applications stored on a remote server when operated on a computer system, comprising:

program instructions that generate a folder/file structure for a remote application that is to be shared on the segmented network including an icon folder, a launch folder, a linker folder, and an empty command file;

program instructions that generate a file server drive mapping to a linking infrastructure data for the remote application;

program instructions that retrieve an icon associated with the remote application;

program instructions that generate an application launcher file for the remote application;

program instructions that generate an application linker file associated with the application launcher file for the remote application;

program instructions that generate a command file for copying the application linker file to a user's desktop;

program instructions that copy the retrieved icon, the application launch file, the application linker file, and the command file to the folder/file structure for the remote application;

program instructions that update the linker file to point to the file server drive;

program instructions that deploy a folder for user access to the remote application, the folder including the remote application icon, the application linker file, the application launcher file, and the command file; and program instructions that copy the application linker file to the user's desktop to enable execution of the remote application.

12. The non-transitory computer readable medium for controlling user access from a segmented network to shared remote applications of claim 11 further comprising program instructions that test a mechanism for instantiating the remote application on a user's desktop.

13. The non-transitory computer readable medium for controlling user access from a segmented network to shared remote applications of claim 12 wherein the program instructions that test a mechanism for instantiating the remote application comprise program instructions that open a corresponding command file and copy the application linker file to the user's desktop to launch the remote application.

14. The non-transitory computer readable medium for controlling user access from a segmented network to shared remote applications of claim 11 wherein the application launcher file is generated using a terminal server client on a user's workstation.

* * * * *